United States Patent [19]

Oliver

[11] Patent Number: 5,059,874
[45] Date of Patent: Oct. 22, 1991

[54] HIGH VOLTAGE REGULATOR FOR CRT DISPLAY
[75] Inventor: Kirk D. Oliver, Forest Park, Ill.
[73] Assignee: Zenith Electronics Corporation, Glenview, Ill.
[21] Appl. No.: 634,673
[22] Filed: Dec. 27, 1990
[51] Int. Cl.[5] ............................................. H01J 29/70
[52] U.S. Cl. .................... 315/411; 315/408
[58] Field of Search ................................ 315/411, 408

[56] References Cited
U.S. PATENT DOCUMENTS
4,614,899 9/1986 Webb et al. ....................... 315/411
4,965,496 10/1990 Haferl .................................. 315/371

Primary Examiner—Theodore M. Blum

[57] ABSTRACT

A horizontal deflection and high voltage regulation system for CRT displays and television receivers utilizes a single horizontal output transistor driving a conventional deflection yoke and high voltage transformer. A diode modulator and pulse width modulating system is coupled to the horizontal deflection yoke to provide control of horizontal scan size. A separate diode modulator and pulse width modulator is coupled to the horizontal transformer. A comparator is coupled to a resistive high voltage divider to produce an error voltage indicative of CRT anode voltage. The error voltage thus developed is applied to the diode modulator and pulse width modulator operative upon the high voltage transformer to control high voltage in response to changes of CRT beam current loading imposed thereon.

8 Claims, 3 Drawing Sheets

HIGH VOLTAGE REGULATOR FOR CRT DISPLAY

FIELD OF THE INVENTION

This invention relates generally to cathode ray tube display systems and particularly to those used in computing systems and television receivers.

BACKGROUND OF THE INVENTION

Computing systems typically utilize one or more display monitors to provide a visual input/output capability for the system. Since display monitors are similar in many respects to conventional television receiver displays, many technologies, including the present invention, may be applied effectively to both. In both systems, a cathode ray tube (CRT) includes an evacuated envelope usually made of high-strength glass. The envelope includes a generally flat or slightly curved faceplate or viewing screen together with a funnel shaped bell and extending neck. The interior side of the faceplate supports a phosphor screen. In monochrome displays, a single electron gun is supported within the CRT neck and is directed toward the phosphor screen. The electron gun produces a beam of electrons which are directed toward the faceplate striking the phosphor screen and causing visible light to be emitted therefrom. In color display systems, a plurality of electron guns are used together with a phosphor screen which supports plural areas of phosphors having differing color light emitting characteristics. A shadow mask or similar structure is interposed between the electron guns and the phosphor screen to cause each of the electron guns to stimulate an associated type of colored light emitting phosphor.

Whether the display system is monochrome or color, the electrons emanating from the electron gun or guns form a CRT beam which is scanned in both the horizontal and vertical directions across the faceplate to form a raster. In most instances, the horizontal scan system is operative at a higher frequency than the vertical scan system. Thus, the horizontal scan moves the electron beam rapidly from side to side across the faceplate while the vertical scan system causes the successive horizontal scans to be moved progressively from top to bottom to complete a display frame and form the raster.

In the majority of the presently used display systems, electron beam scanning is accomplished by electromagnetic deflection of the CRT beam. A deflection yoke is supported upon the CRT envelope between the electron guns and the faceplate. The deflection yoke supports a plurality of deflection coils which are coupled to the horizontal and vertical scan systems. Horizontal and vertical scan signals provided by the respective scan systems are coupled to the windings of the deflection yoke to produce corresponding electromagnetic fields which bend the electron beam and thereby direct it to the desired portion of the CRT faceplate. Both the horizontal and vertical scan signals include longer duration sloped scan portions followed by shorter duration high amplitude retrace portions. The latter are utilized at the completion of each respective scan interval to return the electron beam to its starting position. In addition, the retrace portion of the horizontal scan signal can be used to develop the high voltage necessary to accelerate the electron beam toward the CRT faceplate.

The character of the image displayed in a CRT display system results from variation or modulation of the intensity of the scanned CRT electron beam. This intensity modulation must be properly timed or synchronized to the horizontal and vertical rate scanning of the raster. Thus, as the electron beam is scanned across the faceplate to form a raster, the desired portions of the faceplate are illuminated by synchronized modulation of the electron beam to provide the desired image.

One of the problems associated with CRT displays which is also shared by television receivers arises from the relationship between CRT beam current intensity, high voltage potential, and deflection sensitivity. As CRT beam current intensity changes, the loading imposed upon the high voltage power system is also changed which in turn causes an inverse change in the high voltage potential. As high voltage potential is changed, the degree of electron beam bending which results from the electromagnetic fields of the deflection yoke (deflection sensitivity) is also changed. For example, an increase in CRT beam current imposes a greater load upon the high voltage system causing a reduction of high voltage potential. The reduction of high voltage potential produces a corresponding increase in deflection sensitivity (more electron beam bending) which in turn causes the raster to be enlarged or "bloom". Because the CRT beam current intensity modulation is synchronized to the horizontal and vertical scan, the displayed image is undesirably enlarged as the raster blooms.

In the event the changes in beam current exist for relatively long time intervals (eg. several vertical scan periods), the entire raster becomes expanded and the displayed image is correspondingly enlarged. While this general enlargement of the display may be annoying, an even more deleterious effect results from abrupt relatively short term changes in beam current. Such shorter duration beam current changes cause localized or partial blooming and display enlargement. The result is that portions of the displayed image are expanded or shifted with respect to the remaining image elements.

To meet the difficulties associated with raster blooming in response to beam current changes, designers of computer display monitors and television receivers have usually attempted to "stiffen" or regulate the high voltage generating system and render it less sensitive to beam current changes. The detailed structure of such systems varies substantially. However, all generally include some means for sensing CRT high voltage and regulating the high voltage potential in a compensating manner. In some systems, a high voltage shunt regulator is used while in others the retrace time is altered. In addition, completely redundant horizontal scan systems and high voltage systems are used. The objective is to increase high voltage power as beam current increases, thereby maintaining a relatively constant high voltage. To the extent the high voltage potential is maintained constant, the above-described changes in deflection sensitivity in response to beam current and the resulting raster blooming are avoided. However, shunt regulators are expensive and waste power and redundant systems are very costly. Changing retrace time is complex due to interactive effect upon the remainder of the system.

In addition to the above-described circumstances which render cost efficient and effective high voltage regulation difficult in both television receivers and display monitors, additional problems arise which are particularly evident in many display monitor environments. While the horizontal scan and high voltage generating systems of television receivers are designed to meet narrow frequency variations, display monitors for computing systems are often required to operate over a substantial frequency range. Because the horizontal deflection and high voltage systems of display monitors include a plurality of complex tuned highly interactive system components, variation of scan frequency upsets the relationship between horizontal deflection and high voltage generation. In particular, a difficult problem arises in that deflection yoke power and high voltage system power do not properly track during frequency variation if display size is maintained constant. Thus, the problem of high voltage regulation in display monitors is further exacerbated in multiple frequency environments.

While the above-described regulation systems provide some benefit in responding to the problem of raster blooming, they tend to be complex, expensive and/or inefficient and are often unable to meet the demands of a multiple frequency environment.

There remains, therefore, a need in the art for an inexpensive, efficient high voltage regulation system which effectively controls high voltage, compensates for changes in CRT beam current intensity and accommodates substantial changes in scan frequency.

Accordingly, it is a general object of the present invention to provide an improved high voltage regulation system for CRT displays. It is a more particular object of the present invention to provide an improved high voltage regulation system for CRT displays which substantially maintains image size despite changes an image intensity and scan frequency. It is a still more particular object of the present invention to provide an improved high voltage regulation system for displays which is efficient and relatively inexpensive.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
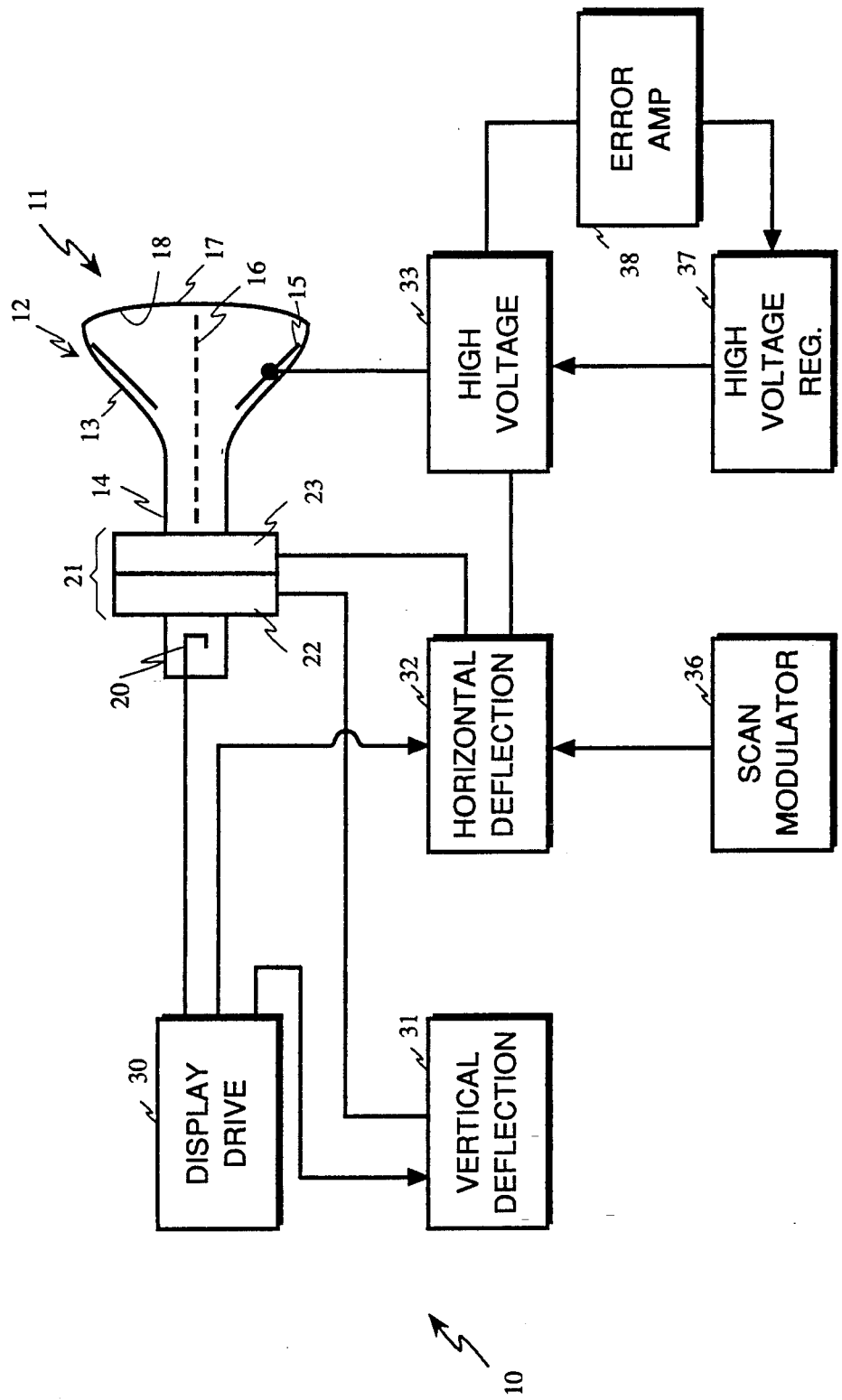
FIG. 1 sets forth a block diagram of a high voltage regulation system constructed in accordance with the present invention.

FIG. 1 sets forth a block diagram of a display monitor constructed in accordance with the present invention and generally referenced by numeral 10. Display monitor 10 includes a conventional cathode ray tube 11 having an evacuated envelope 12 which includes a faceplate 17, a tapered funnel 13 and an elongated neck portion 14. In accordance with conventional fabrication techniques, an electron gun 20 is supported within neck 14 and is directed toward faceplate 17. A conventional high voltage electrode 15 is supported within envelope 12. A display drive 30 also constructed in accordance with conventional fabrication techniques includes circuitry for producing the video signals applied to electron gun 20 of CRT 11. A conventional yoke assembly 21 having a vertical deflection yoke 22 and a horizontal yoke 23 is supported upon envelope 12 and produces electromagnetic deflection fields within CRT 11. A vertical deflection system 31 is coupled to vertical yoke 22 and to display drive 30. A horizontal deflection system 32 is coupled to horizontal yoke 23 and to display drive 30. A high voltage system 33 is coupled to high voltage electrode 15 and horizontal deflection system 32. A high voltage regulator 37 constructed in accordance with the present invention and described below in greater detail is coupled to high voltage system 33. An error amplifier 38 is coupled to a source of feedback signal within high voltage system 33 (described below) and to regulator 37. A scan modulator 36 is coupled to horizontal deflection system 32.

In operation, display drive 30, in accordance with conventional fabrication techniques, causes electron gun 20 to produce an intensity modulated stream of electrons formed into a CRT beam current 16. Electron beam 16 is directed toward faceplate 17 and phosphor screen 18 supported thereon. The electrons within CRT beam 16 are accelerated toward faceplate 17 by the high voltage present on electrode 15 and produce visible light as they strike phosphor screen 18. Horizontal deflection system 32 produces conventional horizontal scan signals which when applied to yoke 23 produce corresponding electromagnetic fields which in turn are operative upon CRT beam 16 causing side to side deflection thereof. As mentioned above, the horizontal scanning of CRT beam 16 causes it to be repeatedly scanned across faceplate 17 and retraced to its initial starting position. Vertical deflection system 31 produces vertical scan signals which are applied to vertical yoke 22 to produce corresponding electromagnetic fields within envelope 12 and deflect CRT beam 16 vertically between the top and bottom of faceplate 17. As is also described above, the vertical deflection of CRT beam 16 occurs more slowly than horizontal scan causing successive horizontal scans to progress downwardly with respect to faceplate 17 and to produce a scanned raster. Horizontal deflection 32 also produces a high amplitude short duration retrace pulse which is coupled to high voltage 33 and utilized to provide a high voltage accelerating potential at electrode 15. The purpose of the high voltage at electrode 15 is to provide the above-referenced acceleration of the electrons within CRT beam 16.

Thus, display drive 30, vertical deflection system 31, horizontal deflection system 32, high voltage system 33 and yoke 21 cooperate in accordance with conventional fabrication techniques to produce a scanned raster upon faceplate 17 of CRT 11. In further accordance with the process described above, display drive 30 also provides intensity modulation of CRT beam 16 to impart the desired image character to the image formed on faceplate 17. The proper display of the desired image is dependent, in part, upon the correct timing between the intensity modulations of CRT beam 16 and the vertical and horizontal scanning process. To facilitate this timing, synchronizing signals are produced by display drive 30 and applied to vertical deflection system 31 and horizontal deflection system 32.

As mentioned above, horizontal deflection system 32 and high voltage system 33 are interactively coupled. Thus, as changes are imposed upon display monitor 10 due to changes of CRT beam current intensity and/or changes of scan frequency, both horizontal scan width and high voltage potential react. As is also mentioned above, the reactions of horizontal deflection system 32 and high voltage system 33 are improperly related to maintain constant high voltage potential and image size. In accordance with an important advantage of the present invention described below in greater detail, high voltage regulator 37 and scan modulator 36 respond to such changes to provide independent control of high voltage 33 and horizontal deflection 32 and thus maintain the desired relationship. In a manner also described below in greater detail, changes of the load imposed upon high voltage system 33 produce correction signals which are coupled to error amplifier 38 and thereafter applied to high voltage regulator 37. By means also set forth below in greater detail, high voltage regulator 37 responds to the applied control signal to produce the required response of high voltage system 33 to compensate for changes of system load.

Concurrently, scan modulator 36, by means described below, is operative upon horizontal deflection system 32 to maintain a substantially constant scan width. Thus, individual control of high voltage and horizontal deflection is provided without the prohibitive costs associated with redundant systems.

Figure 2:
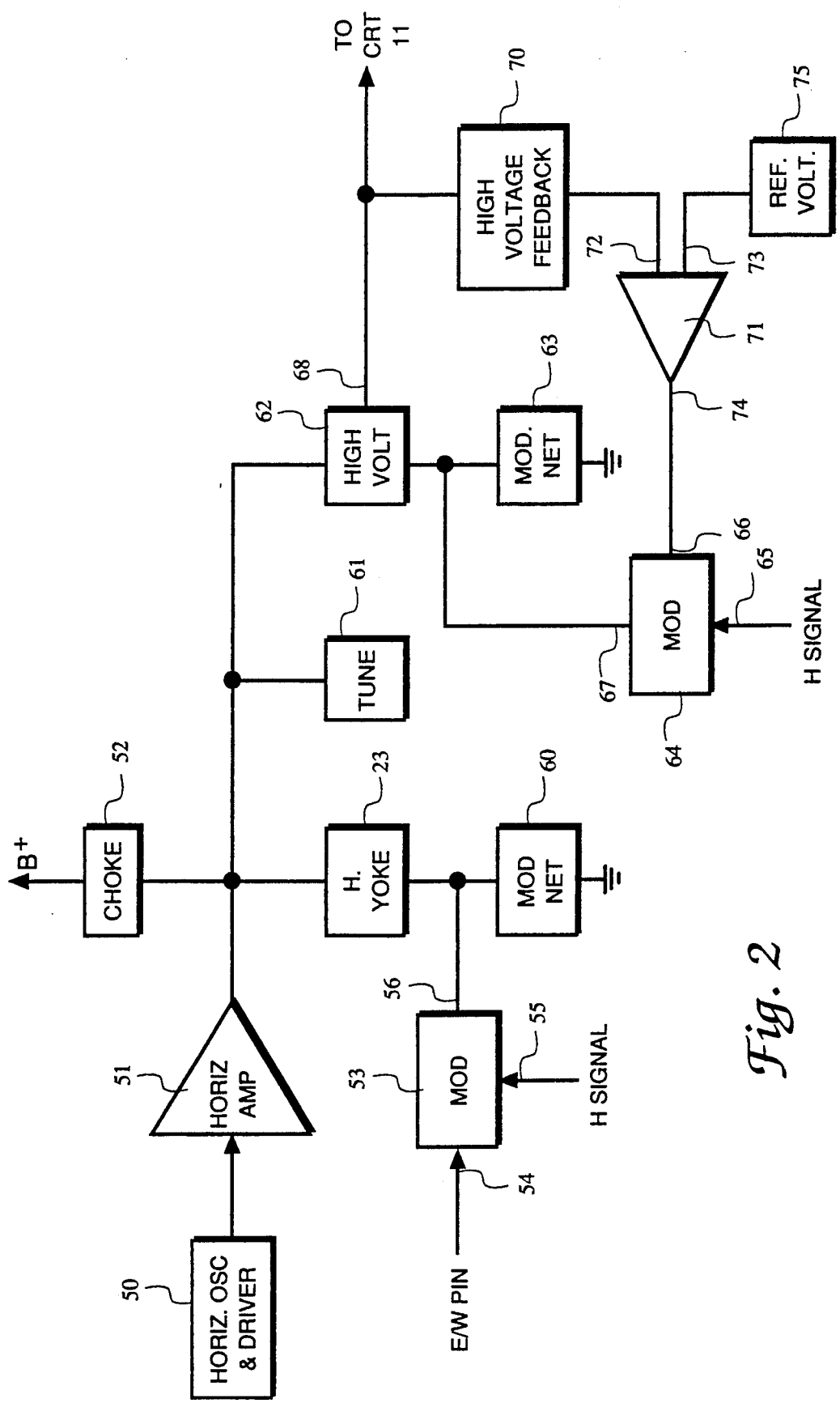
FIG. 2 sets forth a more detailed partial block diagram of the present invention high voltage regulation system.

FIG. 2 sets forth a block diagram of the present invention system. A horizontal oscillator and driver circuit 50 is coupled to a horizontal amplifier 51. The output of amplifier 51 is coupled to a source of operating supply by a choke 52. A tuning capacitance 61 is coupled to the output of amplifier 51. A horizontal yoke 23 is coupled to the output of horizontal amplifier 51 and to a modulation network 60. A modulator 53 which in its preferred form comprises a pulse width modulating circuit includes a pair of input terminals 54 and 55 and an output terminal 56 coupled to yoke 23 and modulation network 60. To facilitate the pulse width modulation operation of modulator 53, input 54 is coupled to the "east/west" pin cushion correction system of monitor 10 (not shown). Input 55 is coupled to a convenient source of horizontal deflection rate signal within horizontal deflection 32.

A high voltage transformer 62 constructed in accordance with conventional fabrication techniques is coupled to horizontal amplifier 51 and includes a high voltage output terminal 68 which is coupled to CRT 11. A modulation network 63 is coupled to high voltage transformer 62. A modulator 64 which in its preferred form comprises a pulse width modulation system includes a pair of inputs 65 and 66 and an output 67 coupled to high voltage transformer 62 and modulation network 63. Input 65 is coupled to a convenient source of horizontal deflection rate signal within horizontal deflection system 32 (seen in FIG. 1).

A high voltage feedback circuit 70 is coupled to output 68 of high voltage transformer 62. A comparator 71 includes an input terminal 72 coupled to high voltage feedback 70, an input terminal 73 and an output terminal 74. The latter is coupled to input 66 of modulator 64. A source of reference voltage 75 is coupled to input 73 of comparator 71.

In operation, horizontal oscillator and driver 50 function in accordance with conventional fabrication techniques to provide a horizontal deflection rate drive signal which is applied to horizontal amplifier 51. Horizontal amplifier 51 comprises the horizontal output stage of horizontal deflection system 32 (seen in FIG. 1) which is coupled to a source of operating voltage by choke 52. In further accordance with conventional fabrication techniques, horizontal oscillator and driver 50 causes amplifier 51 to be switched between conducting and nonconducting states to produce deflection current within horizontal yoke 23. This deflection current is, for the most part, also carried by modulation network 60. Modulator 53 responds to the applied horizontal rate signal at input 55 to conduct periodically and during such conduction, change the voltage applied to horizontal yoke 23. The extent of conduction of modulator 53 is controlled by the pin cushion correction signal applied to input 54. Thus, in accordance with conventional pulse width modulation techniques, modulator 53 and modulation network 60 cooperate to maintain a substantially constant deflection current within horizontal yoke 23. As a result, the scan width of horizontal deflection system 32 (seen in FIG. 1) is maintained substantially constant. Thus, despite variations which occur in beam current intensity and variations of horizontal scan frequency, modulator 53 and modulation network 60 maintain substantially constant deflection current within horizontal deflection yoke 23 and changes of horizontal scan size are avoided.

High voltage transformer 62 is constructed in accordance with conventional fabrication techniques and in accordance therewith produces an output high voltage at terminal 68 which is applied to CRT 11 to provide the above-described CRT beam accelerating potential. In addition and in accordance with the present invention, modulation network 63 is coupled to high voltage transformer 62 in a series coupling such that a substantial portion of primary current for high voltage transformer 62 is carried by modulation network 63. Modulator 64, in its preferred form, comprises a pulse width modulator which responds to the horizontal rate signal applied to input 65 to periodically conduct and divert a portion of the energy within high voltage transformer 62. The degree of energy diversion caused by modulator 64 is controlled in response to the applied signal at input 66. Thus, as the input signal at input 66 is varied, the conduction interval during each operative cycle of pulse width modulator 64 is varied which in turn varies the energy diverted from high voltage transformer 62.

As mentioned above, the load imposed upon high voltage system 33 (seen in FIG. 1) by CRT 11 is varied in response to changes of CRT beam current intensity. Accordingly, high voltage feedback 70 is coupled to high voltage transformer 62 in a manner described below in greater detail which produces an error signal indicative of the degree of CRT beam current loading. This error signal is coupled by high voltage feedback 70 to input 72 of comparator 71. A DC reference voltage 75 produced in accordance with conventional techniques is applied to input 73 of comparator 71. Comparator 71 functions in accordance with conventional techniques to produce an output signal indicative of the difference between the reference signal at input 73 and the error signal at input 72. This differential signal is applied to input 66 of modulator 64 to control the degree of modulation within modulator 64. Thus, as CRT beam current increases, an increased load is imposed upon high voltage transformer 62 which is sensed by high voltage feedback 70 and comparator 71 to produce a modulation signal at modulator 64 which causes a reduced proportion of energy to be diverted from high voltage transformer 62. With less energy diverted from high voltage transformer 62, more energy is available to maintain the desired high voltage. Conversely, in the event CRT beam current is reduced, the load upon high voltage transformer 62 is similarly reduced. This reduced load is sensed by high voltage feedback 70 and comparator 71 to produce a corresponding modulation signal at input 66 of modulator 64 causing a compensating increase in the energy diverted from high voltage transformer 62. As a result, undesired increases in high voltage which would otherwise occur with reduced CRT beam current are avoided.

In accordance with an important aspect of the present invention, it will be apparent from the above description that the separate modulation of horizontal deflection power within yoke 23 and high voltage power within high voltage transformer 62 of the present invention system permits individual control of scan size and high voltage. As a result, substantial variations of CRT beam current loading and scan frequency may be independently compensated for while maintaining substantially constant scan size.

Figure 3:
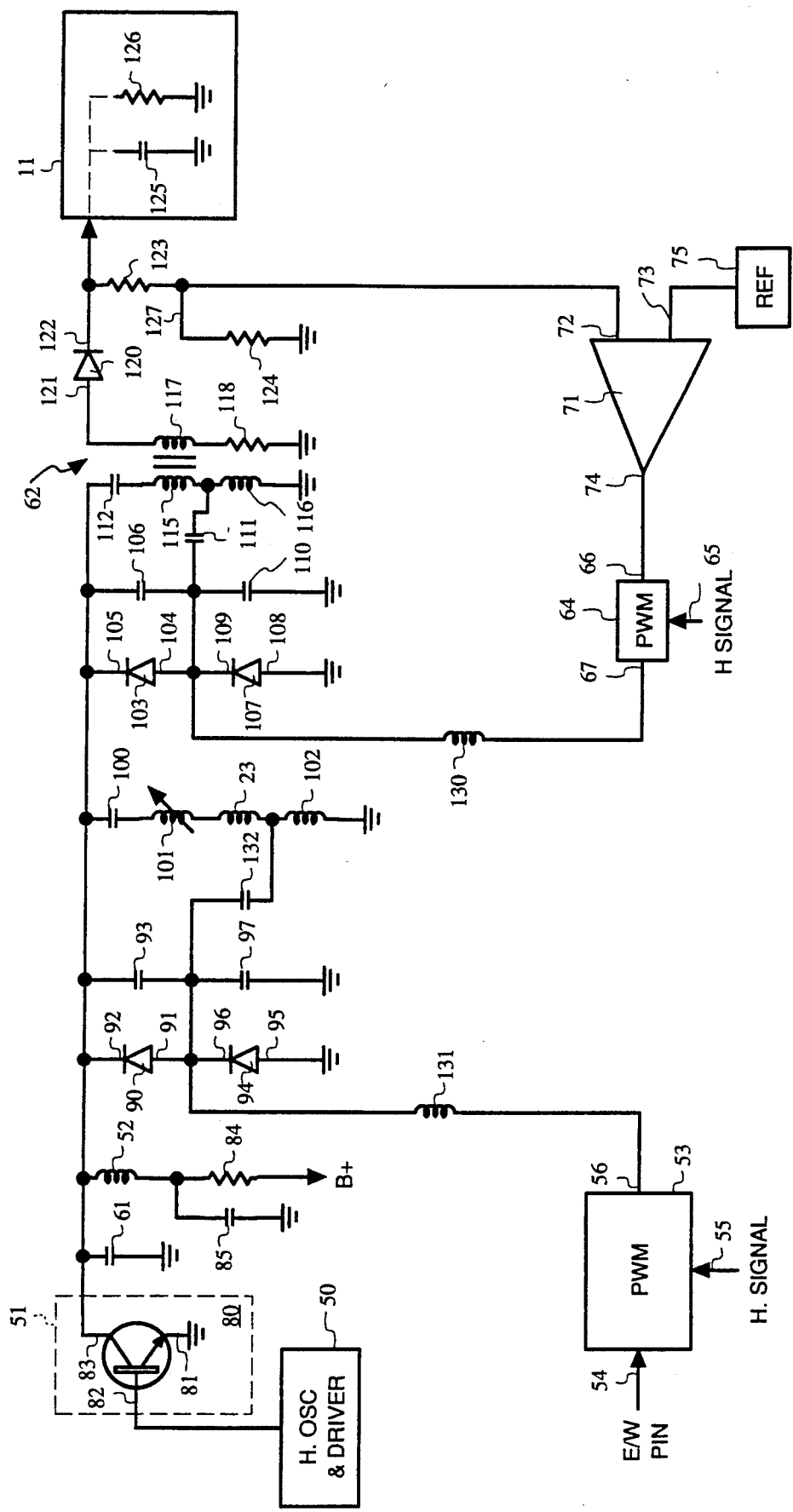
FIG. 3 sets forth a schematic diagram of the present invention high voltage regulation system.

FIG. 3 sets forth a schematic diagram of the present invention high voltage regulation system. Horizontal amplifier 51 includes an NPN transistor 80 having an emitter 81 coupled to ground, a base 82 coupled to horizontal oscillator and driver circuit 50 and a collector 83. A tuning capacitor 61 is coupled between collector 83 and ground. A choke 52 couples collector 83 to a source of operating supply voltage via a resistor 84. A filter capacitor 85 couples the junction of resistor 84 and choke 52 to ground. A series combination of a capacitor 100, a linearity coil 101, a deflection yoke 23 and a modulating inductance 102 is coupled between collector 83 and ground. A pair of capacitors 93 and 97 are coupled between collector 83 and ground while the junction of yoke 23 and modulating inductance 102 is coupled to the junction of capacitors 93 and 97 by a capacitor 132. A pair of diodes 90 and 94 are series coupled between collector 83 and ground. Diode 90 has an anode 91 coupled to the junction of capacitors 93 and 97 and a cathode 92 coupled to collector 83 of horizontal output transistor 80. Diode 94 has an anode coupled to ground and a cathode coupled to the junction of capacitors 93 and 97.

A pulse width modulator 53 has an output 56 coupled to the junction of diodes 90 and 95 by an inductor 131, an input 54 coupled to a source of east/west pin cushion correction signal, and an input 55 coupled to a convenient source of horizontal rate signal.

High voltage transformer 62 includes a primary winding 115 coupled to collector 83 of horizontal output transistor 80 by a capacitor 112. Primary winding 115 of high voltage transformer 62 is further coupled to ground by a modulating inductance 116. A secondary winding 117 of high voltage transformer 62 is coupled to ground by a resistor 118 while a high voltage rectifier 120 includes an anode 121 coupled to the remaining end of secondary winding 117 and a cathode 122 which is coupled to CRT 11. A voltage divider, formed by a series combination of resistors 123 and 124, is coupled between the cathode of rectifier 120 and ground. For purposes of describing the operation of the present invention system, CRT 11 is shown to represent a capacitive load 125 and a resistive load 126. It will be understood by those skilled in the art that capacitor 125 and resistor 126 are shown purely for purposes of explanation and that CRT 11 is constructed in accordance with conventional fabrication techniques. A pair of capacitors 106 and 110 are serially coupled between collector 83 of horizontal output transistor 80 and ground. A capacitor 111 couples the junction of capacitors 106 to the junction of primary winding 115 of high voltage transformer 62 and modulating inductance 116. A diode 103 has an anode 104 coupled to the junction of capacitors 106 and 110 and a cathode 105 coupled to collector 83 of horizontal output transistor 80. A diode 107 has an anode 108 coupled to ground and a cathode 109 coupled to the junction of capacitors 106 and 110.

A comparator 71 constructed in accordance with conventional fabrication techniques has an input 72 coupled to junction 127 of resistors 123 and 124, an input 73 coupled to a source of reference potential 75, and an output 74. A pulse width modulating circuit 64 constructed in accordance with conventional fabrication techniques has an input 66 coupled to output 74 of comparator 71, an input 65 coupled to a source of horizontal deflection rate signal, and an output 67 coupled to the junction of capacitors 106 and 110 by an inductor 130.

In operation, horizontal oscillator and driver 50 produce a horizontal deflection rate switching signal which is coupled to base 82 of horizontal output transistor 80. Output transistor 80 functions essentially as a horizontal deflection rate switch and thus alternates between conducting and nonconducting states at the horizontal deflection rate. In accordance with conventional operation, the horizontal rate switching of output transistor 80 produces a horizontal deflection current within yoke 23. In further accordance with conventional fabrication techniques, the deflection current within yoke 23 flows through the series combination of capacitor 100, linearity coil 101 and modulating inductance 102 and comprises a generally sloped scan current portion together with a short duration high intensity retrace portion. The inductive value of linearity coil 101 is adjustable in accordance with conventional fabrication techniques to provide the desired slope and characteristic of the scan portion of current within yoke 23. In further accordance with conventional fabrication techniques, the switching of horizontal output transistor 80 produces a similar current within the series combination of capacitor 112, primary winding 115 of high voltage transformer 62 and modulating inductance 116. The current within primary winding 115 is inductively coupled to secondary winding 117 in accordance with the turns ratio therebetween to provide a substantial voltage increase. The increased voltage across secondary winding 117 is rectified by high voltage rectifier 120 in accordance with conventional fabrication techniques to provide the above-described CRT beam accelerating potential for CRT 11. As mentioned above, CRT 11 represents a capacitive and resistive load upon high voltage transformer 62. The resistive portion of this load is varied in accordance with the intensity of the CRT electron beam 11. Thus, during periods of high CRT beam intensity, the load upon transformer 62 is increased while during periods of low CRT beam intensity, the resulting load is decreased.

As mentioned above, the voltage applied to CRT 11 changes as the beam current within CRT 11 changes. Because of the voltage divider action of resistors 123 and 124, the changes of the CRT high voltage appearing at cathode 122 of rectifier 120 are proportionally sensed at junction 127. Thus, the voltage at junction 127 forme a feedback signal indicative of CRT beam current loading and CRT high voltage changes. The feedback signal thus developed is compared to reference voltage 75 by comparator 71 producing an error signal indicative of the difference therebetween which is amplified and applied to pulse width modulator 64. As described above, pulse width modulator 64 responds to the horizontal rate signal at input 65 to periodically conduct. The combination of diodes 103 and 107, capacitors 106, 110 and 111, modulating inductance 116 and pulse width modulator 64 form a conventional diode modulator coupled to primary winding 115 of high voltage transformer 62. Accordingly, pulse width modulator 64 periodically conducts to divert energy from primary winding 115 of high voltage transformer 62. The extent of energy diverted by pulse width modulator 64 in the operation of the diode modulator described above is controlled by the error voltage applied at input 66. In accordance with the present invention, pulse width modulator 64 diverts increased energy from primary winding 115 of high voltage transformer 62 during reduced CRT beam currents which in turn compensates for the reduced load reflected upon high voltage transformer 62. Conversely, during increased CRT beam currents, pulse width modulator 54 diverts a reduced amount of energy from primary winding 115 and thus compensates for the increased loading of such increased CRT beam currents. As a result, high voltage is regulated independently from horizontal scan width.

Diodes 90 and 94, capacitors 93 and 97, and modulating inductance 102 together with pulse width modulator 53 form a conventional diode modulator operative upon yoke 23 while capacitor 132 provides "dynamic S correction". In accordance with conventional operation, the diode modulating thus formed is operative to vary the deflection power within yoke 23 and thereby control horizontal scan size. In further accordance with its conventional operation, pulse width modulator 53 is operative to divert a portion of the energy within yoke 23 in response to the horizontal rate signal applied to input 55 and the pin cushion correction signal applied to input 54. The horizontal rate signal at input 55 provides a synchronizing signal while the signal at input 54 provides a vertical rate east/west modulating signal which controls the extent to which pulse width modulator 53 diverts energy from yoke 23. Inductor 131 integrates the current between pulse width modulator 64 and diodes 90 and 94. Thus, horizontal scan width is maintained independent of the high voltage regulating system and east-west pincushion correction is provided.

It is important to note that in accordance with an important aspect of the present invention, the system described above provides independent and separate control of the horizontal scan width and the high voltage system without the use of redundant horizontal output transistors. Thus, independent control of scan width and high voltage are provided without resorting to the expensive redundancy required by the prior art systems. It will also be apparent that the independent and separate control of scan width and high voltage increase the present invention system's capability to compensate for changes of CRT beam current loading and operation at multiple horizontal scan frequencies.

What has been shown, therefore, is an improved high voltage regulation system for CRT displays which substantially maintains image size despite changes of image intensity. The system shown avoids redundancy of horizontal output devices while providing independent and separate control of horizontal scan width and high voltage.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a display system having a cathode ray tube in which an intensity modulated electron beam is directed toward a display screen, vertical deflection means for deflecting the electron beam vertically, horizontal deflection means including a horizontal deflection yoke for producing horizontal deflection currents within the horizontal deflection yoke for deflecting the electron beam horizontally, and high voltage means for producing an electron beam accelerating potential and having a high voltage transformer including primary and secondary windings, high voltage regulating means comprising:

sensing means for producing a signal indicative of electron beam accelerating potential;

a source of reference potential related to a desired electron beam accelerating potential;

a comparator coupled to said sensing means and said source of reference potential producing an error signal related to the difference between said electron beam accelerating potential and said desired electron beam accelerating potential;

modulation means coupled to said comparator and to the primary winding of the high voltage transformer for controlling the energy within the primary winding to regulate the accelerating potential in response to said error signal and maintain said desired electron beam accelerating potential.

2. High voltage regulating means as set forth in claim 1 wherein said modulation means include a first diode modulator coupled to the primary winding of the high voltage transformer.

3. High voltage regulating means as set forth in claim 2 wherein said modulation means includes a first modulating inductance coupled in series with the primary winding of the high voltage transformer forming a first junction therebetween.

4. High voltage regulating means as set forth in claim 3 wherein said modulation means includes a first pulse width modulator coupled to said first junction and said comparator operative to drain energy from the primary winding inversely related to the intensity changes of the electron beam current.

5. High voltage regulating means as set forth in claim 4 wherein the horizontal deflection means includes a horizontal output transistor having a collector coupled to the primary winding of the high voltage transformer and to the horizontal deflection yoke and wherein said first diode modulator includes:

a first diode having an anode coupled to said first junction and a cathode coupled to the collector of the output transistor;

a second diode having an anode coupled to ground and a cathode coupled to said first junction; and first and second capacitors coupled in parallel with said first and second diodes respectively.

6. High voltage regulating means as set forth in claim 5 wherein the horizontal deflection means includes a second modulating inductance in series with the horizontal deflection yoke forming a second junction therebetween and a second diode modulator coupled to the deflection yoke at said second junction for controlling the deflection energy in the deflection yoke.

7. In a display having a cathode ray tube, vertical deflection means, a horizontal deflection circuit including a horizontal output transistor and a horizontal deflection yoke coupled to the horizontal output transistor, a high voltage transformer having a primary winding coupled to the horizontal output transistor and a secondary winding, a high voltage rectifier coupled to the secondary winding, high voltage regulating means comprising:

a modulation inductance serially coupled to the primary winding of the high voltage transformer forming a common junction therebetween;

a first diode having an anode coupled to said common junction and a cathode coupled to the horizontal output transistor;

a second diode having an anode coupled to ground and a cathode coupled to the common junction;

first and second capacitors coupled in parallel with said first and second diodes respectively;

a voltage divider, defining a divider point, coupled between the high voltage rectifier and ground;

a comparator coupled to said divider point of said voltage divider producing an error signal in response to the voltage at said divider point; and a pulse width modulator coupled to said common junction and said comparator and operative to drain energy from the primary winding of the high voltage transformer in response to said error signal.

8. High voltage regulating means as set forth in claim 7 further including a horizontal scan modulator coupled to the horizontal deflection yoke.

* * * * *